United States Patent
McLees et al.

(10) Patent No.: US 10,203,693 B2
(45) Date of Patent: Feb. 12, 2019

(54) FLIGHT CONTROL SYSTEM WITH SYNTHETIC INERTIAL GLIDESLOPE DEVIATION AND METHOD OF USE

(71) Applicant: THE BOEING COMPANY, Chicago, IL (US)

(72) Inventors: Robert E. McLees, Kirkland, WA (US); Robert Erik Freeman, Seattle, WA (US); Prachya Panyakeow, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 95 days.

(21) Appl. No.: 15/340,349

(22) Filed: Nov. 1, 2016

(65) Prior Publication Data
US 2018/0120850 A1    May 3, 2018

(51) Int. Cl.
| | |
|---|---|
| *G05D 1/02* | (2006.01) |
| *G08G 5/02* | (2006.01) |
| *B64D 45/04* | (2006.01) |
| *G01C 21/16* | (2006.01) |
| *G01C 23/00* | (2006.01) |

(52) U.S. Cl.
CPC .......... *G05D 1/0202* (2013.01); *B64D 45/04* (2013.01); *G01C 21/165* (2013.01); *G01C 23/005* (2013.01); *G08G 5/02* (2013.01)

(58) Field of Classification Search
CPC ............................... G05D 1/0202; G08G 5/02
See application file for complete search history.

(56) References Cited

U.S. PATENT DOCUMENTS

| | | |
|---|---|---|
| 3,818,476 A | 6/1974 | Coulter et al. |
| 4,311,466 A | 1/1982 | Carpenter et al. |
| 3,041,607 A | 6/1982 | Rhodes et al. |
| 4,399,425 A | 8/1983 | Taylor |
| 4,429,312 A | 1/1984 | Chisholm |
| 4,534,000 A * | 8/1985 | Bliss .................... G05D 1/0676 244/186 |
| 4,567,483 A | 1/1986 | Bateman et al. |
| 4,680,587 A | 7/1987 | Chisholm |
| 4,916,612 A | 4/1990 | Chin et al. |
| 5,387,863 A | 2/1995 | Lo et al. |
| 5,523,949 A | 6/1996 | Agate et al. |

(Continued)

FOREIGN PATENT DOCUMENTS

| | | |
|---|---|---|
| EP | 0315227 A2 | 5/1989 |
| EP | 2511733 A2 | 10/2012 |
| EP | 2765389 A1 | 8/2014 |

OTHER PUBLICATIONS

Extended European Search Report for Application No. 17190618.3, dated Feb. 23, 2018, 9 pages.

(Continued)

*Primary Examiner* — Anshul Sood
(74) *Attorney, Agent, or Firm* — Armstrong Teasdale LLP (57) ABSTRACT

A flight control module for computing glideslope deviation during landing of an aircraft is provided. The flight control module includes a communication interface and a processor. The communication interface is configured to receive inertial data for the aircraft. The processor is coupled to the communication interface and configured to compute an inertial glideslope deviation based on the inertial data.

20 Claims, 5 Drawing Sheets

(56) References Cited

U.S. PATENT DOCUMENTS

| | | |
|---|---|---|
| 5,745,054 A | 4/1998 | Wilkens |
| 5,786,773 A | 7/1998 | Murphy |
| 6,178,363 B1 | 1/2001 | McIntyre et al. |
| 6,606,545 B1 | 8/2003 | McCall et al. |
| 7,546,183 B1 | 6/2009 | Marcum |
| 7,619,556 B1 | 11/2009 | McCusker |
| 7,917,254 B2 | 3/2011 | Krough |
| 7,941,251 B2 | 5/2011 | Krough et al. |
| 8,035,547 B1 | 10/2011 | Flanigan et al. |
| 8,160,758 B2 | 4/2012 | Call et al. |
| 8,630,756 B2 | 1/2014 | Fleiger-Holmes et al. |
| 8,698,655 B2 | 4/2014 | Flanigan et al. |
| 8,798,820 B2 | 8/2014 | Hooks |
| 9,098,999 B2 | 8/2015 | Snow et al. |
| 9,257,050 B2 | 2/2016 | Fleiger-Holmes et al. |
| 2007/0020588 A1 | 1/2007 | Batcheller et al. |
| 2009/0069960 A1 | 3/2009 | Lapp et al. |
| 2010/0017053 A1 | 1/2010 | Krogh et al. |
| 2012/0265376 A1* | 10/2012 | Fleiger-Holmes ........ G01S 1/18 701/16 |
| 2013/0041529 A1 | 2/2013 | He et al. |
| 2013/0289802 A1* | 10/2013 | Beaufrere .............. G05D 1/042 701/3 |
| 2014/0229039 A1* | 8/2014 | Murphy ............... G01C 21/165 701/17 |
| 2014/0288733 A1 | 9/2014 | He et al. |
| 2016/0012735 A1 | 1/2016 | Koukol et al. |

OTHER PUBLICATIONS

Extended European Search Report for Application No. 17190626.6, dated May 28, 2018; 7 pages.

* cited by examiner

FLIGHT CONTROL SYSTEM WITH SYNTHETIC INERTIAL GLIDESLOPE DEVIATION AND METHOD OF USE

BACKGROUND

The field of the disclosure relates generally to flight control systems and, more specifically, to a flight control module utilizing a synthetic inertial glideslope deviation.

Many known aircraft feature an automated landing system that controls the aircraft during landing. Automated landing systems have become increasingly more common and are frequently relied on for both instrument landings under instrument flight rules (IFR) and landings performed under visual flight rules (VFR). Known automated landing systems utilize various receivers, such as multi-mode receivers (MMRs), for example, to receive guidance signals transmitted from the ground. Such guidance signals may include, for example, instrument landing system (ILS) signals, global positioning service (GPS) landing system (GLS) signals, and/or microwave landing system (MLS) signals. The guidance signals inform the aircraft of its position relative to a desired vertical and lateral path to the runway and through roll-out after touchdown. The desired vertical path is referred to as the glideslope and the lateral path is referred to as the localizer. The glideslope is typically defined as a 3° descent with a desired intercept with the ground at 1000 feet beyond the runway threshold. The localizer guides the aircraft to the runway centerline.

The guidance signals transmitted from the ground are received by an on-board antenna and routed to redundant MMRs. Each MMR computes a localizer deviation and a glideslope deviation that are routed to a flight control module that includes the automated landing system. The localizer deviation is an indication of the aircraft's position relative to the desired path to the runway centerline. For example, the localizer deviation may indicate the aircraft is approximately 2° left of the runway centerline. The glideslope deviation is an indication of the aircraft's position relative to the desired glideslope to the runway. For example, the glideslope deviation may indicate the aircraft is 1° below the desired glideslope. The flight control module uses the localizer deviation and the glideslope deviation to adjust the automated landing system and to command control surfaces of the aircraft.

Many known automated landing systems require three independently computed localizer and glideslope deviations. Such redundancy ensures that if one localizer deviation or one glideslope deviation fails, the automated landing system still has two good signals to control the aircraft. The redundant equipment necessary for independently computing three localizer and glideslope deviations adds cost and weight to the aircraft. If the available localizer deviation and glideslope deviations disagree beyond a predetermined threshold, the automated landing system forfeits control of the aircraft to the pilot. The availability of reliable, i.e., "good," localizer deviation and glideslope deviation signals is particularly important when the aircraft descends below 200 feet, because the margins for error are tighter and errant control by the automated landing system may result in the aircraft missing the runway. Accordingly, when failures or erroneous localizer or glideslope signals are detected, the flight control system relies on the good localizer and glideslope signals or forfeits control to the pilot.

BRIEF DESCRIPTION

According to one aspect of the present disclosure, a flight control module for computing glideslope deviation during landing of an aircraft is provided. The flight control module includes a communication interface and a processor. The communication interface is configured to receive inertial data for the aircraft. The processor is coupled to the communication interface and configured to compute an inertial glideslope deviation based on the inertial data.

According to another aspect of the present disclosure, a flight control system for landing an aircraft is provided. The flight control system includes a communication bus, first and second multi-mode receivers (MMRs), and a flight control module. The first and second MMRs are coupled to the communication bus and are configured to compute first and second glideslope deviations based on received glideslope signals. The first and second MMRs are further configured to transmit first and second glideslope deviation signals indicative of the first and second glideslope deviations onto the communication bus. The flight control module is coupled to the communication bus and is configured to receive inertial data for the aircraft and the first and second glideslope deviation signals over the communication bus. The flight control module is further configured to compute an inertial glideslope deviation based on the inertial data. The flight control module is further configured to select one glideslope deviation from among the first and second glideslope deviations and the inertial glideslope deviation. The flight control module is further configured to transmit the one glideslope deviation to an automated landing system for the aircraft.

According to yet another aspect of the present disclosure, a method of detecting a glideslope deviation for an aircraft during landing is provided. The method includes receiving instrument landing system (ILS) glideslope signals. The method includes computing MMR glideslope deviations with respect to a main landing gear of the aircraft based on the ILS glideslope signals. The method includes filtering the MMR glideslope deviations. The method includes translating a filtered MMR glideslope deviation from the main landing gear to a guidance control point (GCP) for the aircraft. The method includes initializing an inertial glideslope deviation computation based on the filtered MMR glideslope deviation. The method includes integrating inertial data, generated by an inertial reference unit (IRU) for the aircraft, from the filtered MMR glideslope deviation to generate an inertial glideslope deviation with respect to the IRU. The method includes translating the inertial glideslope deviation from the IRU to the GCP.

The features, functions, and advantages that have been discussed can be achieved independently in various embodiments or may be combined in yet other embodiments further details of which can be seen with reference to the following description and drawings.

DETAILED DESCRIPTION

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
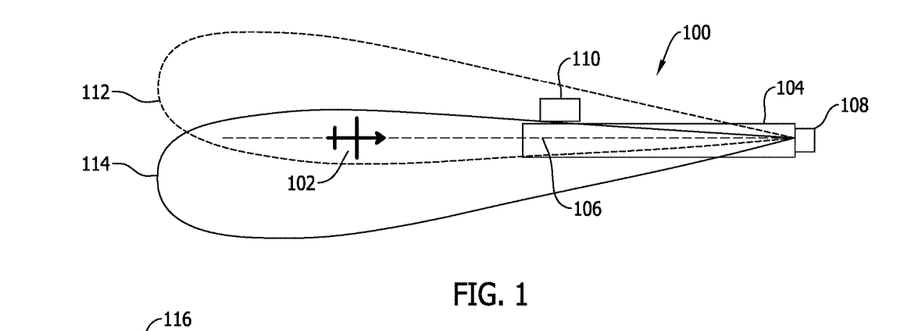
FIG. 1 is a top perspective diagram of an exemplary instrument landing system (ILS) for use in landing an aircraft.
Figure 2:
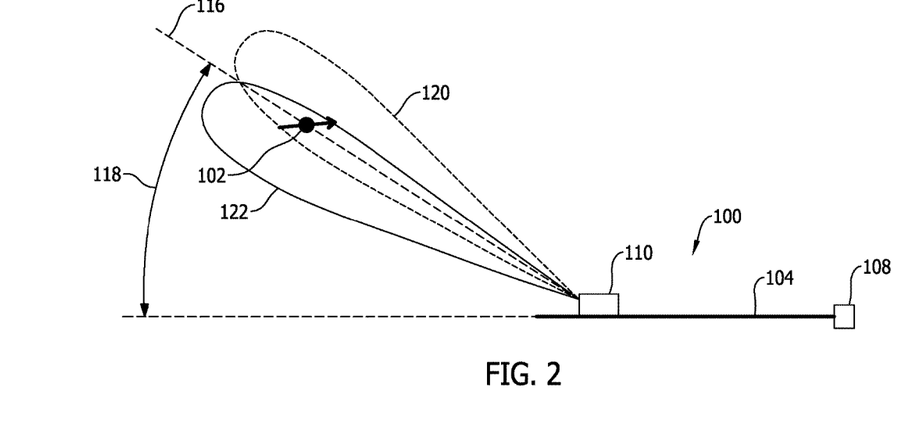
FIG. 2 is a side perspective diagram of the exemplary ILS shown in FIG. 1.

FIG. 1 is a perspective diagram, from a top-view, of an exemplary instrument landing system (ILS) 100 for use in landing an aircraft 102. FIG. 2 is another perspective diagram, from a side view, of ILS 100. Aircraft 102 is illustrated during approach for landing on a runway 104. Runway 104 is characterized by a runway centerline 106 that extends towards and beyond aircraft 102 for illustrative purposes.

Referring to FIG. 1, in the exemplary embodiment, ILS 100 includes a localizer transmitter 108 and a glideslope transmitter 110. Localizer transmitter 108 transmits a first localizer beam 112 and a second localizer beam 114 towards aircraft 102. First localizer beam 112 and second localizer beam 114 cooperate define an ILS localizer signal that is received by aircraft 102 and processed to generate localizer deviations indicative of the lateral position of aircraft 102 relative to runway centerline 106. The localizer signals are typically used to control aircraft 102 through landing and rollout, i.e., deceleration along runway prior to taxi.

Referring to FIG. 2, aircraft 102 approaches runway 104 along a predefined glideslope 116 that intercepts runway 104 at a predefined distance beyond a runway threshold for runway 104. The predefined distance is typically, for example, at least 1000 feet from the runway threshold, which is typically the site of glideslope transmitter 110. Glideslope 116 is defined by a glideslope angle 118 measured between glideslope 116 and runway 104. A typical glideslope, for example, is defined by glideslope angle 118 being equal to approximately 3°. Glideslope transmitter 110 transmits a first glideslope beam 120 and a second glideslope beam 122 towards aircraft 102. First glideslope beam 120 and second glideslope beam 122 define an ILS glideslope signal that is received by aircraft 102 and that is processed to generate glideslope deviations indicative of the vertical position of aircraft 102 relative to glideslope 116. The glideslope signals are typically used to control aircraft 102 until it reaches a flare altitude, i.e., an altitude when the nose of aircraft 102 pitches up prior to landing, which typically occurs between 50 and 75 feet. When the flare altitude is reached, aircraft 102 typically switches to a radio altimeter to guide aircraft 102 to runway 104 for landing. In alternative embodiments, flare altitude may be greater than 75 feet or, in some embodiments, below 50 feet.

Figure 3:
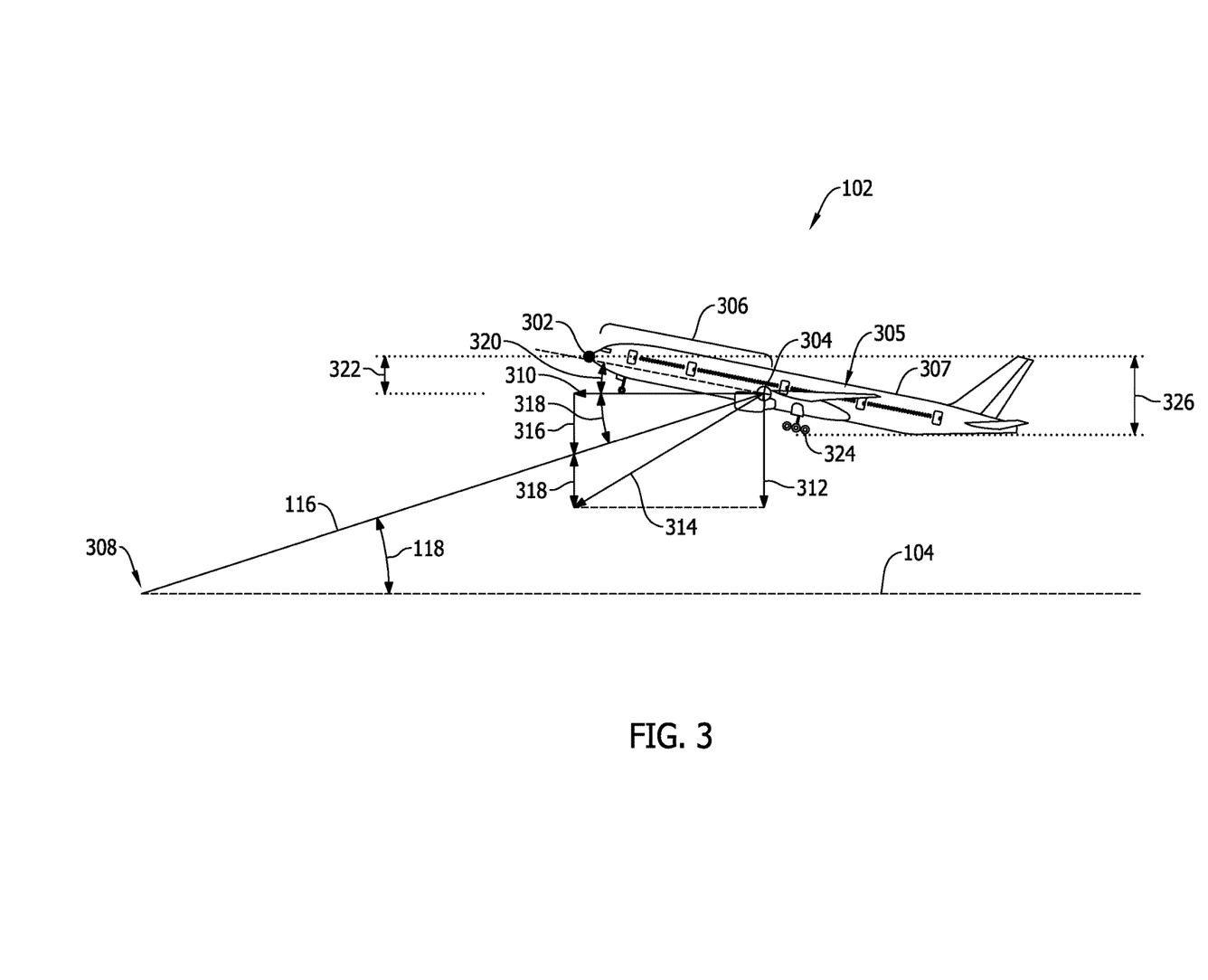
FIG. 3 is a side perspective diagram of the aircraft shown in FIGS. 1 and 2 during landing.

FIG. 3 is a perspective diagram of aircraft 102 during landing. FIG. 3 illustrates a side-view of aircraft 102 approaching runway 104 during the landing process. Aircraft 102 includes a guidance control point (GCP) 302 to which all flight control commands for aircraft 102 are referenced. GCP 302 is typically located at the nose of aircraft 102. Aircraft 102 also includes an inertial reference unit (IRU) 304 that includes various sensors for detecting linear and angular accelerations of aircraft 102, which are translatable to accelerations, velocities, and attitude of aircraft 102 along three axis, i.e., pitch, roll, and yaw. IRU 304 is typically located at or near the center of aircraft 102, which is illustrated in FIG. 3 as the intersection of the wings 305 and fuselage 307 of aircraft 102. Accordingly, GCP 302 and IRU 304 are typically separated by a distance 306 extending along a portion of the length of fuselage 307 of aircraft 102.

Aircraft 102 approaches runway 104 following glideslope 116, which is defined by glideslope angle 118 with respect to the plane of runway 104. Glideslope 116 meets runway 104 at an intercept 308. Aircraft 102 is traveling at a ground speed 310 and with a vertical velocity 312. Ground speed 310 and vertical velocity 312 are both measurable at IRU 304 and define a velocity vector 314. Vertical velocity 312 includes two components: a glide path rate 316 and a glideslope error rate 318. Given inertial accelerations measured by IRU 304 and glideslope 116, aircraft 102 may compute inertial vertical velocity 312 that, over time, increases or decreases a glideslope deviation.

Aircraft 102 operates with a degree of pitch attitude, or simply pitch 320. Consequently, GCP 302 is generally elevated with respect to IRU 304. The vertical correction to GCP 322 is a function of pitch 320 and distance 306. Moreover, MMR glideslope deviation calculations are referenced at main landing gear 324 of aircraft 102, which require further translation to account for a vertical correction 326 from main landing gear 324 to GCP 302.

Figure 4:
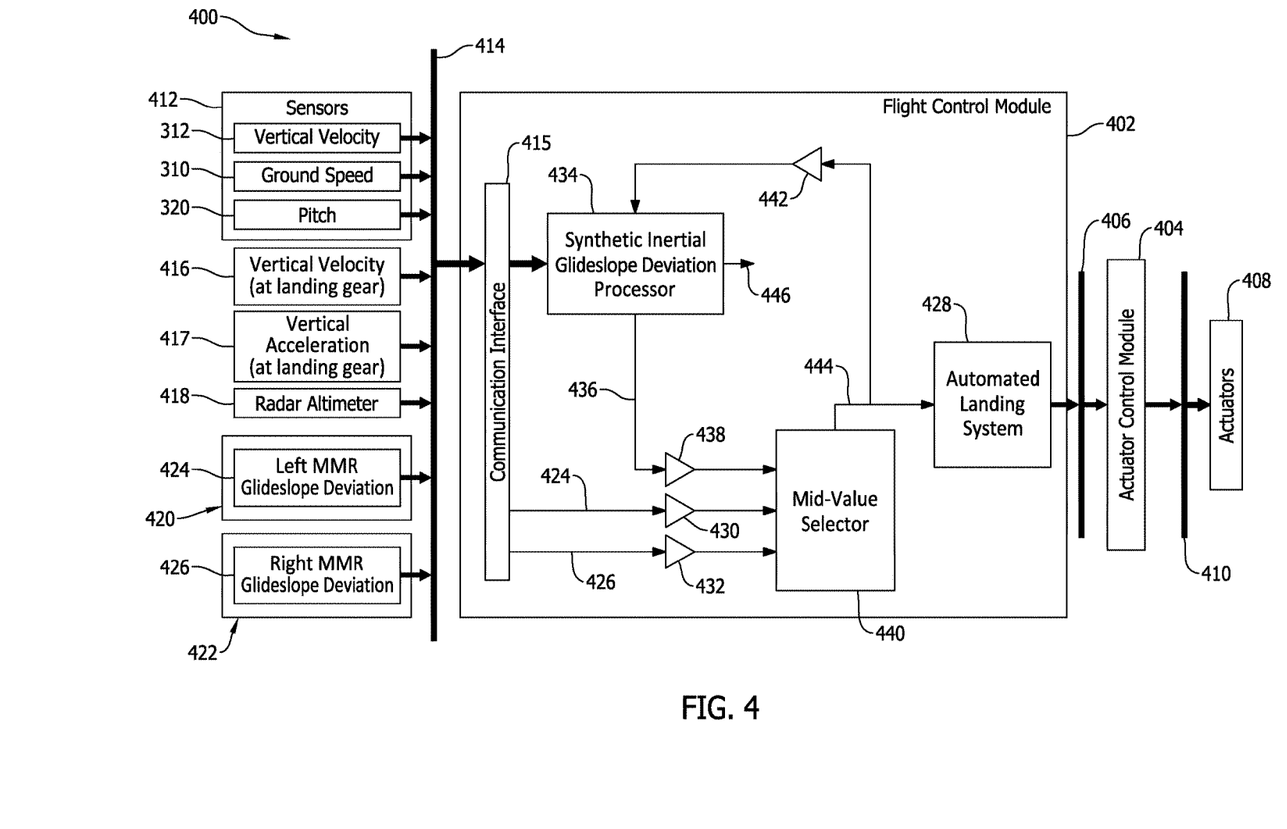
FIG. 4 is block diagram of an exemplary flight control system for the aircraft shown in FIGS. 1-3.

FIG. 4 is block diagram of an exemplary flight control system 400 for aircraft 102, shown in FIGS. 1-3. Flight control system 400 includes a flight control module 402 that controls aircraft 102 by transmitting commands to an actuator control module 404. Flight control module 402 communicates with actuator control module 404 over a communication bus 406. Actuator control module 404 controls one or more actuators 408 that are attached to various flight control surfaces of aircraft 102. Actuator control module 404 communicates with actuators 408 over a communication bus 410.

Aircraft 102 includes various sensors 412 that measure flight parameters and generate data that is transmitted onto a communication bus 414. Flight control module 402 is communicably coupled to communication bus 414 through communication interface 415 and gains access to the data.

Sensors 412 include various accelerometers and gyroscopes located at IRU 304 that provide vertical velocity 312, ground speed 310, and pitch 320. Communication bus 414 is configured to be coupled to IRU 304, which provides the inertial data. Communication bus 414 is further coupled to various other data sources, such as a navigation system (not shown), a flight management system (not shown) that provides vertical velocity 416 and vertical acceleration 417 referenced to landing gear 324, and a radar altimeter 418 that provides altitude for aircraft 102. Communication bus 414 is further coupled to a left MMR 420 and a right MMR 422. Left MMR 420 provides a left MMR glideslope deviation 424. Right MMR 422 provides a right MMR glideslope deviation 426.

Communication interface 415 receives first and second glideslope deviation signals indicative of respective glideslope deviations, such as left MMR glideslope deviation 424 and right MMR glideslope deviation 426, computed based on the glideslope transmission received by aircraft 102.

Flight control module 402 includes an automated landing system 428. Flight control module 402 receives and processes data from communication bus 414 to produce a glideslope deviation signal that is used by automated landing system 428 to generate commands for actuator control module 404. Flight control module 402 receives left MMR glideslope deviation 424 and right MMR glideslope deviation 426 expressed in difference in the depth of modulation (ddm). Flight control module 402 includes amplifiers 430 and 432 that each apply a gain, $K_{ddm\text{-}degrees}$, to the ddm values to convert left MMR glideslope deviation 424 and right MMR glideslope deviation 426 to degrees.

Flight control module 402 includes a synthetic inertial glideslope deviation module (SIGD) processor 434 that computes an inertial glideslope deviation 436, also referred to as a SIGD, based on data received over communication bus 414. Inertial glideslope deviation 436 is converted from feet to degrees by an amplifier 438 that applies a gain, $K_{feet\text{-}degrees}$. Flight control module 402 selects which glideslope signal to use to command actuator control module 404 using a signal selection fault detection (SSFD) algorithm. Flight control module 402 includes a mid-value selector 440 for carrying out SSFD. Mid-value selector 440 is sometimes referred to as an SSFD module, which is configured to select one glideslope deviation from among MMR glideslope deviations 424 and 426, and inertial glideslope deviation 436 for use in controlling automated landing system 428 of aircraft 102. Mid-value selector 440 selects a middle value from among left MMR glideslope deviation 424, right MMR glideslope deviation 426, and inertial glideslope deviation 436. The selected glideslope deviation 444 is converted from degrees to feet by an amplifier 442 and fed back to SIGD processor 434. SIGD processor 434 complementary-filters the selected glideslope deviation and generates a complementary-filtered glideslope deviation 446.

The addition of inertial glideslope deviation 436 enables continued use of automated landing system 428 in the event of an undetected failure in one of left MMR 420 and right MMR 422 below an alert height, or altitude. Typically, the alert height is 200 feet. If one of left MMR glideslope deviation 424 and right MMR glideslope deviation 426 fails and is not respectively detected by left MMR 420 or right MMR 422, mid-value selector 440 detects the failure as the failed signal will be different from the two good signals. Generally, known systems utilize three MMRs, which add weight and cost to aircraft 102. When the two remaining good glideslope deviation signals mis-compare, automated landing system 428 disengages and forfeits control of aircraft 102 to the pilot. Other known systems utilize two self-monitoring MMRs. In the event of an undetected failure in left MMR glideslope deviation 424 or right MMR glideslope deviation 426, the two signals mis-compare, but no third signal is available. Such a failure results in automated landing system 428 disengaging. Inertial glideslope deviation 436 introduces a third glideslope signal that enables flight control module 402 to withstand an undetected failure in one of left MMR glideslope deviation 424 or right MMR glideslope deviation 426.

Flight control module 402 may be embodied on one or more processors. Likewise, SIGD processor 434, mid-value selector 440, and automated landing system 428 may be embodied on one or more processors configured to carry out the functionality described above.

Figure 5:
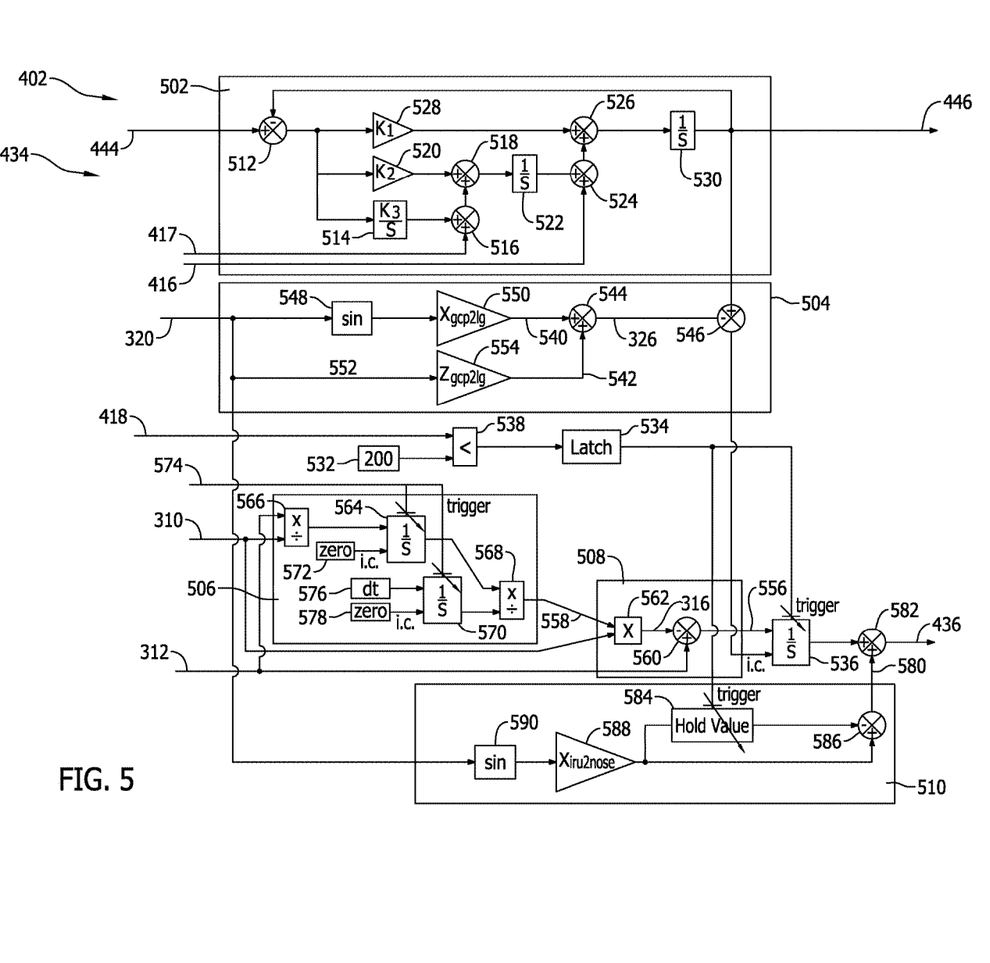
FIG. 5 is a functional block diagram of an exemplary flight control module for use in the flight control system shown in FIG. 4.

FIG. 5 is a functional block diagram of flight control module 402 and, more specifically, SIGD processor 434, shown in FIG. 4. SIGD processor 434 includes a complementary filter 502, a translation block 504, a glideslope computation block 506, an inertial glideslope error rate block 508, and a translation-to-GCP block 510.

Complementary filter 502 blends high-frequency content of inertial data from IRU 304 with low-frequency content of left MMR glideslope deviation 424 and right MMR glideslope deviation 426 to produce a smooth, complementary-filtered glideslope deviation 446. Complementary filter 502 generally operates in terms of feet. Complementary-filtered glideslope deviation 446, expressed in feet, is fed back and subtracted 512 from selected glideslope deviation 444 to produce a glideslope deviation error value. Mid-value selector 440 operates in terms of degrees or radians. Accordingly, selected glideslope deviation 444 is converted to feet by gain 442 prior to use by complementary filter 502 to compute the glideslope deviation error value. The glideslope deviation error value is gained by $K_3$ and integrated 514. The result of integration 514 is added 516 to vertical acceleration 417, and then added 518 to the glideslope deviation error value gained 520 by $K_2$. The result of summing 518 is integrated 522 and added 524 to vertical velocity 416, the result of which is added 526 to the glideslope deviation error value gained 528 by $K_1$. The result of summation 526 is integrated 530 to generate complementary-filtered glideslope deviation 446, which is referenced to landing gear 324. Complementary filter 502 is further characterized by, but not limited to the following equation, where $D_{CF}$ is complementary-filtered glideslope deviation 446 as a function of time, t, and expressed in feet, $D_{sel}$ is selected glideslope deviation 444 as a function of time, t, and expressed in feet, $A_{vert}$ is vertical acceleration 417 as a function of time, t, and $V_{vert}$ is vertical velocity 416 as a function of time, t.

$$D_{CF} = \left[\frac{K_1 S^2 + K_2 S + K_3}{S^3 + K_1 S^2 + K_2 S + K_3}\right] \times \qquad \text{EQ. 1}$$
$$D_{sel} + \left[\frac{S}{S^3 + K_1 S^2 + K_2 S + K_3}\right] \times$$
$$A_{vert} + \left[\frac{S^2}{S^3 + K_1 S^2 + K_2 S + K_3}\right] \times V_{vert}$$

When aircraft 102 descends, as measured by radar altimeter 418, below an altitude threshold 532, complementary-filtered glideslope deviation 446 is latched 534 as an initial condition for integration 536 of inertial glideslope error rate 318. Aircraft altitude from radar altimeter 418 is compared 536 to altitude threshold 532, e.g., 200 feet, to trigger latch 534. Latch 534 prevents toggling due to variations in radar altimeter 418 due to terrain leading up to runway 104, i.e., terrain between aircraft 102 and runway 104.

Translation block 504 translates complementary-filtered glideslope deviation 446 from landing gear 324 to GCP 302. Translation block 504 computes a correction 326 that includes two components: an X component 540 and a Z component 542, the two of which are summed 544 to yield correction 326. Correction 326 is then summed 546 with complementary-filtered glideslope deviation 446, completing the translation from landing gear 324 to GCP 302.

X component 540 is the projection of a distance, $X_{GCP\text{-}LG}$, along a portion of fuselage 307 between main landing gear 324 and GCP 302. The projection is computed as the sine 548 of pitch 320, the result of which is gained 550 by the distance, $X_{GCP\text{-}LG}$. Z component 542 is similarly the projection of a vertical distance, $Z_{GCP\text{-}LG}$, between main landing gear 324 and GCP 302. The projection is computed as the cosine 552 of pitch 320, the result of which is gained 554 by the distance, $Z_{GCP\text{-}LG}$. Translation block 504 is further characterized by, but not limited to, the following equation, where $C_{GCP-LG}$ is correction 326 as a function of time, t, and $Att_{pitch}$ is pitch 320 as a function of time, t.

$$C_{GCP-LG}(t) = X_{GCP-LG} \times \sin(Att_{pitch}(t)) + Z_{GCP-LG} \times \cos(Att_{pitch}(t)) \qquad \text{EQ. 2}$$

Inertial glideslope error rate block 508 computes an error rate 556 based on an average glideslope angle 558, ground speed 310, and vertical velocity 312. Error rate is computed as a difference 560 between vertical velocity 312 and desired glideslope rate 316. Glideslope rate 316 is computed as an arc length, i.e., the multiplication 562 of average glideslope angle 558 and ground speed 310. Inertial glideslope error rate block 508 is further characterized by, but not limited to, the following equation, where $R_{error}$ is error rate 556 as a function of time, t, $S_{gnd}$ is ground speed 310 as a function of time, t, and $avg_{GP}$ is average glideslope angle 558 as a function of time, t, and expressed in radians.

$$R_{error}(t) = V_{vert}(t) - S_{gnd}(t) \times avg_{GP}(t) \qquad \text{EQ. 3}$$

Glideslope computation block 506 computes average glideslope angle 558 as a function of ground speed 310 and vertical velocity 312. Average glideslope angle 558 is a running time-average computed as an integral 564 of inertial altitude rate, i.e., vertical velocity 312, divided 566 by ground speed 310. Integral 564 is then divided 568 by elapsed time 570. Integral 564 is initialized 572 to zero once aircraft 102 is stabilized on glideslope 116. Stability on glideslope 116 is indicated by a logical indicator 574 that is sometimes referred to as "Vert App Active." Elapsed time 570 is an integral of a time delta 576 and is initialized 578 to zero. Glideslope computation block 506 is further characterized by, but not limited to, the following equation, where $t_{stable}$ the time at which logical indicator 574 indicates aircraft 102 is has stabilized on glideslope 116.

$$avg_{GP}(t) = \frac{\int_{t_{stable}}^{t} \frac{V_{vert}}{S_{gnd}} \delta t}{\int_{t_{stable}}^{t} \delta t} \qquad \text{EQ. 4}$$

When aircraft 102 descends below altitude threshold 532, integrator 536 is initialized to complementary-filtered glideslope deviation 446, which represents the glideslope deviation at that altitude. Integrator 536 then integrates error rate 556, which is based on inertial data, to compute inertial glideslope deviation 436. Integration 536 is further characterized by, but not limited to, the following equation, where SIGD is inertial glideslope deviation 436 with respect to IRU 304 as a function of time, t, and expressed in radians, and $t_{200}$ is the time at which aircraft 102 descends to altitude threshold 532, or 200 feet, for example.

$$SIGD(t) = \int_{t_{200}}^{t} R_{error} \delta t \qquad \text{EQ. 5}$$

Integration 536 yields inertial glideslope deviation 436 with respect to IRU 304. A compensation 580 is added 582 to inertial glideslope deviation 436 to correct for the difference between inertial glideslope deviation 436 at IRU 304 and inertial glideslope deviation 436 at GCP 302. Compensation 580 accounts for any pitch attitude changes that occur below altitude threshold 532.

Translation-to-GCP block 510 computes compensation 580 as a function of pitch 320 and distance 306 along a portion of fuselage 307 between IRU 304 and GCP 302. Distance 306 is multiplied 588 by the sine 590 of pitch 320, yielding compensation 580 as a function of time, t. When aircraft 102 descends to altitude threshold 532, the vertical difference between IRU 304 and GCP 302 due to pitch 320 is latched 584 and subtracted 586 from compensation 580 at time, t. Translation-to-GCP block 510 is further characterized by, but not limited to, the following equation, where C is compensation 580 as a function of time, t, $L_{IRU-GCP}$ is distance 306 along the fuselage of aircraft 102 between IRU 304 and GCP 302, $Att_{pitch}$ is pitch 320 as a function of time, t.

$$C(t) = L_{IRU-GCP}[\sin(Att_{pitch}(t)) - \sin(Att_{pitch}(t_{200}))] \qquad \text{EQ. 6}$$

Figure 6:
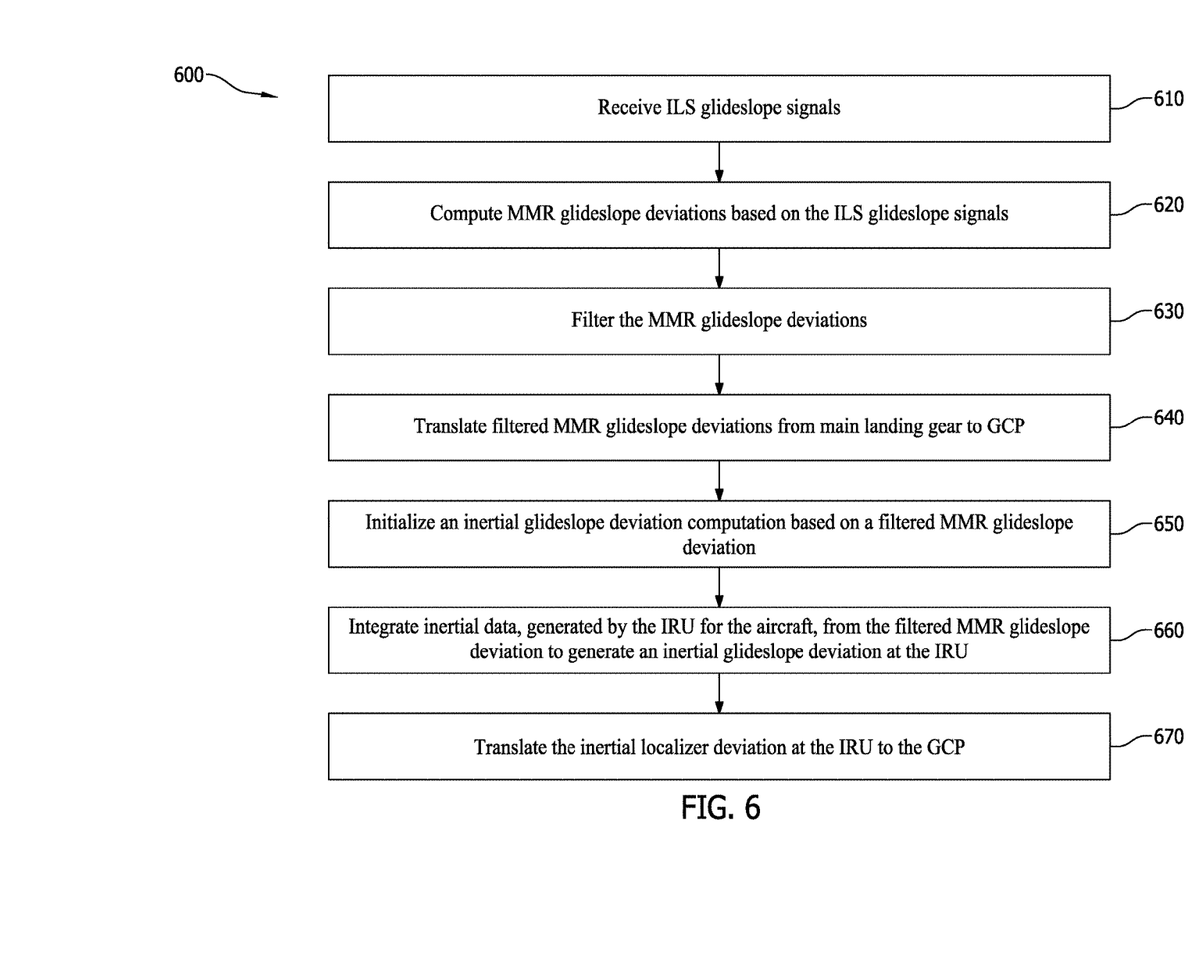
FIG. 6 is a flow diagram of an exemplary method of detecting a glideslope deviation for use in the flight control system shown in FIG. 4.

FIG. 6 is a flow diagram of an exemplary method 600 of detecting a glideslope deviation for use in flight control system 400, shown in FIG. 4, of aircraft 102, shown in FIGS. 1-3. Method 600 begins with aircraft 102 receiving 610 ILS glideslope signals defined by first and second glideslope beams 120 and 122. An antenna for receiving first and second glideslope beams 120 and 122 is typically located in the nose of aircraft 102. The received signals are then passed to left MMR 420 and right MMR 422. Left MMR 420 and right MMR 422 respectively compute 620 MMR glideslope deviations 424 and 426 based on the received ILS glideslope signals. MMR glideslope deviations 424 and 426 are transmitted onto a communication bus 414, such as an ARINC-429 bus, for example.

Flight control module 402 gains access to MMR glideslope deviations 424 and 426 on communication bus 414 through communication interface 415, which may include an ARINC-429 interface circuit card configured to communicate within flight control module 402 using peripheral component interconnect (PCI), PCI Express, PC/104, Ethernet, compact PCI, or other suitable protocol. SIGD processor 434 receives MMR glideslope deviations 424 and 426 and filters 630 them using complementary filter 502 to produce complementary-filtered glideslope deviation 446. Complementary-filtered glideslope deviation 446 is computed with respect to main landing gear 324 of aircraft 102. Complementary-filtered glideslope deviation 446 is translated 640 to GCP 302.

When aircraft 102 descends to altitude threshold 532, the inertial glideslope deviation computation is initialized 650 based on complementary-filtered glideslope deviation 446, which provides the initial condition for integration 536 of glideslope error rate 556. Inertial data is integrated 660 to generate inertial glideslope deviation 436 with respect to IRU 304. Inertial data includes pitch 320, ground speed 310, and vertical velocity 312, which are all determinable based on measurements at IRU 304.

Inertial glideslope deviation 436 is translated 670 from IRU 304 to GCP 302 using translation-to-GCP block 510, which accounts for changes in pitch 320 that occur below altitude threshold 532.

The above described embodiments of flight control systems for use by an aircraft during landing provide an inertial glideslope deviation that is considered in combination with MMR glideslope deviation signals when commanding an automated landing system. More specifically, the inertial glideslope deviation provides assurance the automated landing system can continue an automated landing in the event of an undetected MMR glideslope deviation failure. The flight control systems described herein and, more specifically, flight control modules, generate the inertial glideslope deviation by integrating inertial data from the aircraft's IRU from an initial condition established based on the MMR glideslope deviations.

Exemplary embodiments of methods, systems, and apparatus for flight control systems are not limited to the specific embodiments described herein, but rather, components of systems and/or steps of the methods may be utilized independently and separately from other components and/or steps described herein. For example, the methods may also be used in combination with other non-conventional flight control systems, and are not limited to practice with only the systems and methods as described herein. Rather, the exemplary embodiment can be implemented and utilized in connection with many other applications, equipment, and systems that may benefit from increased efficiency, reduced operational cost, and reduced capital expenditure.

An exemplary technical effect of the methods, systems, and apparatus described herein includes at least one of: (a) generation of a SIGD for consideration in SSFD processes; (b) controlling an automated landing system based on a SIGD; (c) improving reliability of automated landing systems through addition of an inertial glideslope deviation; (d) improving failure detection in MMR glideslope deviation signals; (e) reducing cost and weight of producing triple-redundant glideslope deviation for automated landing systems through elimination of a third MMR device; and (f) improving glideslope accuracy for automated landing systems.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A flight control module for computing glideslope deviation during landing of an aircraft, comprising:
   a communication interface coupled to a radar altimeter and configured to receive:
      first and second glideslope deviation signals indicative of respective glideslope deviations computed based on a glideslope transmission received by said aircraft,
      an altitude of said aircraft measured by the radar altimeter, and
      inertial data for said aircraft;
   a processor coupled to said communication interface and configured to compute an inertial glideslope deviation based on the inertial data when the altitude falls below a predetermined threshold; and
   a signal selection fault detection (SSFD) module configured to select one glideslope deviation from among the respective glideslope deviations when said aircraft is operating above the predetermined threshold, and from among the respective glideslope deviations and the inertial glideslope deviation when said aircraft is operating below the predetermined threshold, wherein the selected glideslope deviation is for use in controlling an automated landing system of said aircraft.

2. The flight control module of claim 1, wherein said SSFD module comprises a mid-value selector configured to select a middle value from among the respective glideslope deviations and the inertial glideslope deviation.

3. The flight control module of claim 1, wherein said processor comprises a complementary filter configured to generate a filtered glideslope deviation based on a glideslope deviation signal received through said communication interface and the inertial data, including a vertical acceleration and a vertical velocity.

4. The flight control module of claim 3, wherein said communication interface is configured to be coupled to an inertial reference unit (IRU) through a communication bus, the IRU comprising a ground speed sensor, a pitch sensor, a vertical velocity sensor, and a vertical acceleration sensor, and wherein the inertial data includes a ground speed, a pitch angle, the vertical velocity, and the vertical acceleration.

5. The flight control module of claim 4, wherein said processor is further configured to initialize integration of the inertial glideslope deviation based on the filtered glideslope deviation from the complementary filter when the altitude falls below the predetermined threshold.

6. The flight control module of claim 5, wherein said processor is further configured to:
   compute an inertial glideslope error with respect to the IRU based on the ground speed, the vertical velocity, and an average glideslope angle computed based on the ground speed and the vertical velocity; and
   apply a correction to the inertial glideslope error to generate the inertial glideslope deviation, the correction computed based on the pitch angle and a distance between the IRU and a guidance control point of said aircraft.

7. A flight control system for landing an aircraft, said flight control system comprising:
   a communication bus;
   first and second multi-mode receivers (MMRs) coupled to said communication bus and configured to:

compute first and second glideslope deviations based on received glideslope signals, and transmit first and second glideslope deviation signals indicative of the first and second glideslope deviations onto said communication bus; and a flight control module coupled to said communication bus and configured to:

receive inertial data for the aircraft and the first and second glideslope deviation signals over said communication bus, initialize an inertial glideslope deviation computation when an altitude of said aircraft falls below a predetermined altitude, compute an inertial glideslope deviation based on the inertial data, select one glideslope deviation from among the first and second glideslope deviations and the inertial glideslope deviation, and transmit the one glideslope deviation to an automated landing system for said aircraft.

8. The flight control system of claim 7 further comprising an actuator control module coupled to said automated landing system through a second communication bus, said actuator control module communicably coupled to a flight control actuator, said automated landing system configured to instruct said actuator control module according to the one glideslope deviation.

9. The flight control system of claim 7 further comprising a radar altimeter configured to detect the altitude of said aircraft, said radar altimeter coupled to said communication bus, wherein said flight control module is further configured to initiate integration of the inertial data when the altitude falls below the predetermined threshold.

10. The flight control system of claim 9, wherein said flight control module is further configured to compute the inertial glideslope deviation when the altitude falls below the predetermined threshold of 200 feet.

11. The flight control system of claim 9, wherein said flight control module is further configured to select a mid-value from among the first and second glideslope deviations and the inertial glideslope deviation as the one glideslope deviation for transmission to said automated landing system.

12. The flight control system of claim 9, wherein said flight control module is further configured to initialize computation of the inertial glideslope deviation based on at least one of the first and second glideslope deviation signals when said aircraft descends below 200 feet in altitude.

13. The flight control system of claim 7, wherein the flight control module is further configured to select one glideslope deviation from among the first and second glideslope deviations when aircraft altitude is above the predetermined threshold.

14. The flight control system of claim 7, wherein the flight control module further comprises a complementary filter configured to filter a selected glideslope deviation signal based on inertial data including a vertical acceleration and a vertical velocity.

15. The flight control system of claim 7, wherein the flight control module further configured to translate the inertial glideslope deviation to a guidance control point (GCP) for the aircraft.

16. A method of detecting a glideslope deviation for an aircraft during landing, said method comprising:

receiving first and second instrument landing system (ILS) glideslope signals;

computing first and second multi-mode receiver (MMR) glideslope deviations with respect to a main landing gear of the aircraft based on the ILS glideslope signals;

filtering the first and second MMR glideslope deviations;

translating a filtered MMR glideslope deviation from the main landing gear to a guidance control point (GCP) for the aircraft;

initializing an inertial glideslope deviation computation based on the filtered MMR glideslope deviation when an altitude of the aircraft falls below a predetermined threshold;

integrating inertial data, generated by an inertial reference unit (IRU) for the aircraft, from the filtered MMR glideslope deviation to generate an inertial glideslope deviation with respect to the IRU; and translating the inertial glideslope deviation from the IRU to the GCP.

17. The method of claim 16, wherein filtering the MMR glideslope deviations comprises blending a vertical acceleration and a vertical velocity, both measured by the IRU, with the MMR glideslope deviations using a complementary filter.

18. The method of claim 16, wherein integrating the inertial data generated by the IRU comprises:

computing inertial glideslope error based on ground speed and vertical velocity measured by the IRU, and an average glideslope angle computed based on the ground speed and the vertical velocity; and integrating the inertial glideslope error from the filtered MMR glideslope deviation to generate the inertial glideslope deviation with respect to the IRU.

19. The method of claim 16, wherein translating the filtered MMR glideslope deviation from the main landing gear to the GCP for the aircraft further comprises:

computing a vertical position difference between the main landing gear and the GCP based on a pitch attitude measured by the IRU; and applying the vertical position difference to the filtered MMR glideslope deviation.

20. The method of claim 16, wherein translating the inertial glideslope deviation at the IRU to the GCP comprises:

computing a vertical position difference between the IRU and the GCP based on a pitch attitude measured by the IRU; and adding the vertical position difference to the inertial glideslope deviation with respect to the IRU to generate an inertial glideslope deviation with respect to the GCP.

* * * * *